United States Patent
Popovich et al.

(10) Patent No.: US 11,422,733 B2
(45) Date of Patent: Aug. 23, 2022

(54) INCREMENTAL REPLICATION BETWEEN FOREIGN SYSTEM DATASET STORES

(71) Applicant: EMC IP Holding Company LLC, Hopkinton, MA (US)

(72) Inventors: Evgeny Popovich, Port Coquitlam (CA); Michael Frank, Seattle, WA (US); Austin Voecks, Bainbridge, WA (US); Oliver Chung, Bellevue, WA (US); Jonathan Walton, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

(21) Appl. No.: 16/915,117

(22) Filed: Jun. 29, 2020

(65) Prior Publication Data

US 2021/0405879 A1 Dec. 30, 2021

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
See application file for complete search history.

(56) References Cited

U.S. PATENT DOCUMENTS

| | | | |
|---|---|---|---|
| 8,706,833 B1* | 4/2014 | Bergant | G06F 16/1844 709/214 |
| 8,799,206 B2* | 8/2014 | D'Souza | G06F 11/2097 707/602 |
| 2003/0023898 A1* | 1/2003 | Jacobs | H04L 67/1095 714/15 |
| 2005/0273650 A1* | 12/2005 | Tsou | G06F 11/1466 714/6.12 |
| 2007/0043715 A1* | 2/2007 | Kaushik | G06F 16/951 |

(Continued)

OTHER PUBLICATIONS

"How SnapMirror works," NetApp Support, https://library.netapp.com/ecmdocs/ECMP1196981/html/GUID-98E2BBA2-2A4F-4261-A390-9A712AB78761.html, last accessed on Jun. 23, 2020, 2 pages.

(Continued)

*Primary Examiner* — David Yi
*Assistant Examiner* — Tahilba O Puche
(74) *Attorney, Agent, or Firm* — Amin, Turocy & Watson, LLP (57) ABSTRACT

Incremental replication between foreign system dataset stores is described herein. A method as described herein can include connecting to a target storage system to facilitate an initial transfer of a dataset from the system to the target storage system, wherein the system is distinct from the target storage system; in response to determining that a first version of the dataset is present on the target storage system, comparing the first version of the dataset to a second version of the dataset stored on the system; and, in response to determining that the second version of the dataset is more recent than the first version of the dataset, transferring a differential between the first version of the dataset and the second version of the dataset to the target storage system, the differential comprising less than all of the second version of the dataset.

20 Claims, 8 Drawing Sheets

(56) References Cited

U.S. PATENT DOCUMENTS

| | | | |
|---|---|---|---|
| 2009/0055464 A1* | 2/2009 | Multer | H04L 67/1095 |
| | | | 709/201 |
| 2010/0257142 A1* | 10/2010 | Murphy | G06F 11/1464 |
| | | | 707/681 |
| 2018/0129679 A1* | 5/2018 | Yao | G06F 16/1734 |

OTHER PUBLICATIONS

"EMC VNX Replication Technologies" Aug. 2013, 32 pages.

* cited by examiner

INCREMENTAL REPLICATION BETWEEN FOREIGN SYSTEM DATASET STORES

TECHNICAL FIELD

The subject application is related to data storage, and more particularly, to techniques for managing data replication between data storage systems.

BACKGROUND

In data storage systems, such as file storage systems and/or object storage systems, a data mover can be employed in software and/or hardware to transfer data between distinct devices and/or systems. For instance, a data mover can allow replication of a file system dataset to a cloud storage system and/or other suitable devices or systems.

Depending on implementation, a data mover can provide both initial (full) and incremental file system dataset replication. Incremental replication, as used herein, refers transferring dataset changes associated with a source storage system since the last successful replication between the source system and a given target system, e.g., instead of the full dataset. However, incremental replication as performed according to this definition can be difficult or impossible to implement in some cases, e.g., in the event of intermediate system failure(s) while executing a chain of replications of the same dataset between multiple storage systems.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a handshake component that establishes a connection with a target storage system to facilitate an initial transfer of a dataset from the data storage system to the target storage system. The executable components can further include a dataset analysis component that, in response to the target storage system indicating via the connection that a first version of the dataset is present at the target storage system, compares the first version of the dataset to a second version of the dataset as stored on the data storage system. The executable components can additionally include an incremental transfer component that, in response to the dataset analysis component determining that the second version of the dataset is more recent than the first version of the dataset, transfers a differential between the first version of the dataset and the second version of the dataset to the target storage system, the differential including less than all of the second version of the dataset.

In another aspect, a method is described herein. The method can include connecting, by a system operatively coupled to a processor, to a target storage system to facilitate an initial transfer of a dataset from the system to the target storage system, where the system is distinct from the target storage system. The method can further include, in response to determining that a first version of the dataset is present on the target storage system, comparing, by the system, the first version of the dataset to a second version of the dataset stored on the system. The method can additionally include, in response to determining that the second version of the dataset is more recent than the first version of the dataset, transferring, by the system, a differential between the first version of the dataset and the second version of the dataset to the target storage system, the differential including less than all of the second version of the dataset.

In an additional aspect, a non-transitory machine-readable medium including computer executable instructions is described herein. The instructions, when executed by a processor of a data storage system, can facilitate performance of operations including initiating an initial transfer of a dataset from the data storage system to a remote storage system that is distinct from the data storage system; in response to the remote storage system indicating that a first revision of the dataset is present on the remote storage system, comparing the first revision of the dataset to a second revision of the dataset as stored on the data storage system; and, in response to the first revision of the dataset being earlier than the second revision of the dataset, transferring a differential between the first version of the dataset and the second version of the dataset to the remote storage system, where the differential includes less than all of the dataset.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As noted above, a data mover can be utilized to transfer datasets between different storage systems. As used herein, the term "dataset" refers to a collection of data (as stored in files, objects, or the like) that is designated for transferal between different locations. By way of example, a data mover can be used to transfer a dataset from a file storage system to another file storage system, an object storage system (e.g., a cloud storage system), and/or any other suitable location(s).

In an aspect, a data mover can transfer data between storage locations via an initial (full) replication of a given dataset followed by respective incremental replications as defined above. While an initial replication of a dataset typically involves a transfer of the full dataset from a source storage site to a target storage site, subsequent incremental replications can be made more efficient by transferring only the portions of the dataset that have changed since a previous replication rather than the full dataset.

Various aspects as described herein can be used to establish incremental dataset replication even between different storage systems that do not have a previous direct relationship. Various aspects as described herein can establish a relationship between a source system and a target system that do not necessarily have previous knowledge of each other. Based on this relationship, an incremental transfer can be initiated by the source system for only changes to a particular dataset that are not present on the target system, given that a dataset that is an ancestor to the replicated dataset can be found on both the source and target systems. As will be described in further detail below, this can be accomplished by, e.g., assigning datasets globally unique identifiers at the time said datasets are defined and utilizing these identifiers to maintain an index of respective datasets hosted by a given storage system along with local histories for each of the respective datasets.

By enabling incremental replication between potentially foreign dataset stores in this manner, various advantages that can improve the functionality of a computing system can be realized. By way of example, network bandwidth usage associated with replication of a dataset between respective dataset stores can be reduced. Additionally, computing resources (e.g., processor cycles, memory usage, power consumption, etc.) associated with transferring data corresponding to a given dataset between different dataset stores can be reduced. As another example, various aspects as described herein can improve storage usage efficiency at a target system, e.g., by reducing or eliminating the transfer and/or storage of portions of a given dataset from a source system to a target system that are already stored at the target system. Other advantages are also possible.

Figure 1:
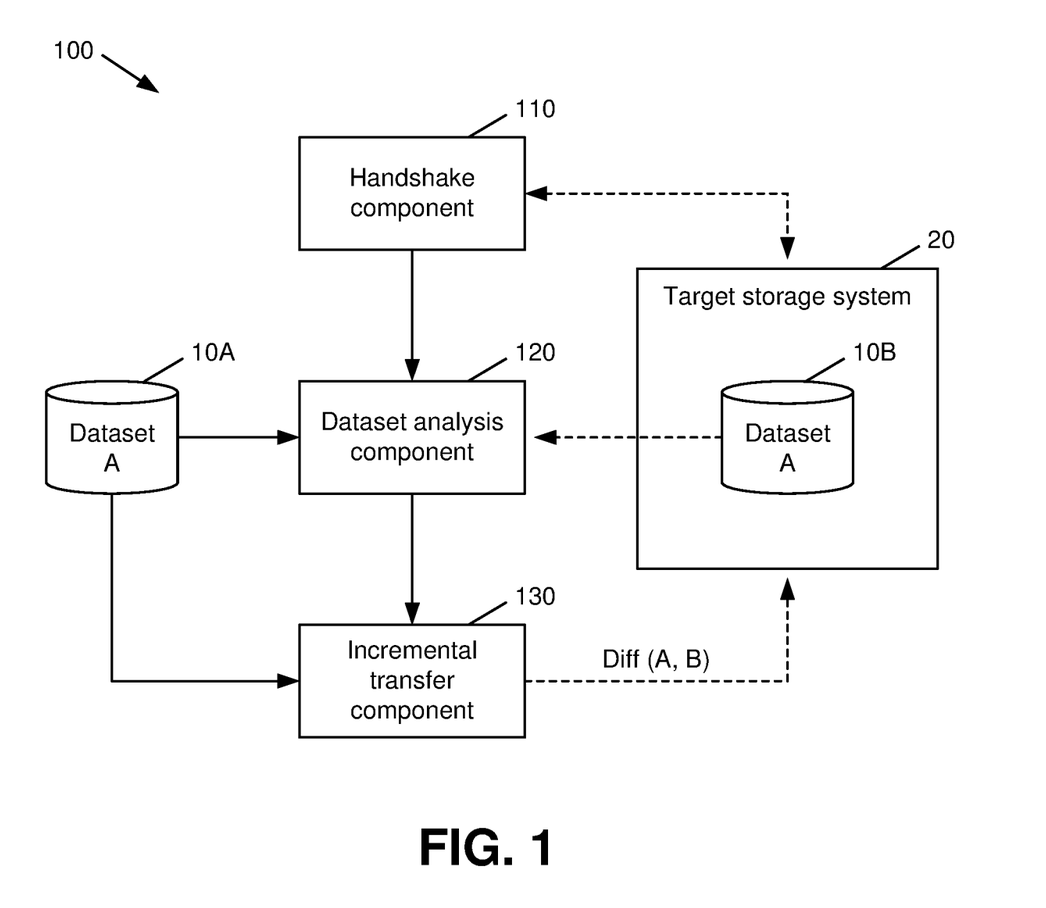
FIG. 1 is a block diagram of a system that facilitates incremental replication between foreign system dataset stores in accordance with various aspects described herein.

With reference now to the drawings, FIG. 1 illustrates a block diagram of a system 100 that facilitates incremental replication of a dataset 10 between foreign system dataset stores, e.g., the system 100 and a target storage system 20, in accordance with various aspects described herein. In some implementations, the target storage system 20 can be a remote storage system and/or otherwise implemented to be distinct from the system 100. Also or alternatively, the target storage system 20 can be the same system as system 100 and/or a subsystem of system 100. Other implementations are also possible. As shown in FIG. 1, system 100 includes a handshake component 110, a dataset analysis component 120, and an incremental transfer component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an aspect, the components 110, 120, 130 can be associated with a computing node and/or other computing device associated with a data storage system (e.g., a file storage system, an object storage system, etc.). Also or alternatively, the components 110, 120, 130 can be associated with a dedicated data mover device that facilitates movement of datasets between different data storage systems associated with the data mover device. In another aspect, the components 110, 120, 130, and/or other components as will be described in further detail below, can be implemented on a same computing device and/or distributed among multiple computing devices.

Returning to FIG. 1, the handshake component 110 of system 100 can establish a connection with a target storage system 20 to facilitate the transfer of a dataset 10 from the system 100 to the target storage system 20. In an aspect, in the event that the system 100 and the target storage system 20 have not previously established a relationship for replication of the dataset 10, the handshake component 110 can establish such a relationship for purposes of facilitating an initial transfer of the dataset 10 from the system 100 to the target storage system 20.

In an aspect, different versions of the dataset 10 can be present at the system 100 and the target storage system 20. As shown in FIG. 1, the copy of the dataset 10 as present at the system 100 is referred to as dataset A (10A), and the copy of the dataset 20 as present at the target storage system 20 is referred to as dataset B (10B). As further shown by FIG. 1, in response to the target storage system 20 indicating via the connection established with the handshake component 110 that the target storage system 20 has a version of the dataset 10, e.g., dataset 10B, the dataset analysis component 120 of system 100 can compare dataset 10B to a version of the dataset 10 stored by system 100, e.g., dataset 10A.

If the dataset analysis component determines both that datasets 10A and 10B are compatible, e.g., they are different versions of a same dataset 10, and that dataset 10A as stored by system 100 is a more recent version of the dataset 10 than dataset 10B as stored on the target storage system 20, the incremental transfer component 130 of system 100 can transfer a differential between dataset 10A and dataset 10B to the target storage system 20, e.g., instead of the full dataset 10A as stored by system 100. Techniques that can be utilized by the dataset analysis component 120 to determine whether a local dataset 10A is compatible with and more recent than the dataset 10B as stored by the remote storage system are described in further detail below, e.g., with respect to FIGS. 4-5.

In an aspect, system 100 can be a file storage system or an object storage system, and dataset 10A as stored at system 100 can be composed of respective files, objects, and/or other data as appropriate for the type of storage system and/or other factors. Similarly, the target storage system 20 can be a file storage system or an object storage system. It should be appreciated, however, that system 100 and the target storage system 20 need not be the same type of storage system. By way of example, if system 100 is a file storage system, the target storage system 20 could be either a file storage system or an object storage system (e.g., a cloud storage system hosted by a cloud storage provider). If system 100 and the target storage system 20 are of different types, conversion of the dataset 10 from file format to object format, or vice versa, can be performed (e.g., by the incremental transfer component and/or respective components at the target storage system 20) either before, during, or after the incremental transfer of the dataset 10 as shown by FIG. 1.

In an aspect, system 100 as shown by FIG. 1 can provide the ability to perform incremental data transfers between storage systems that have not previously had a direct relationship (e.g., via a baseline synchronization). Additionally or alternatively, system 100 can enable incremental data transfers between storage systems of different types or breeds, e.g., file and/or object storage systems that operate according to potentially distinct operating systems, system architectures, etc.

Figure 2:
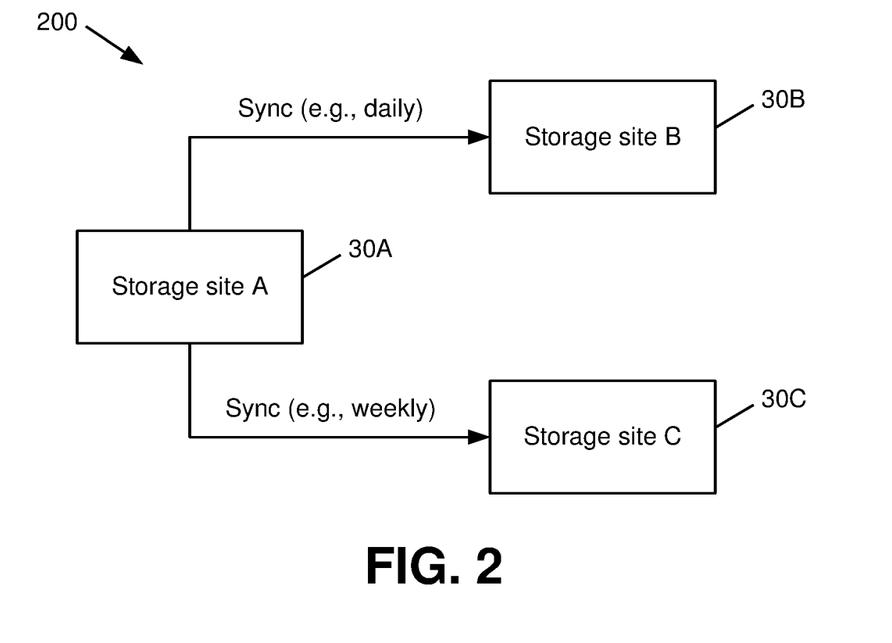
FIGS. 2-3 are respective diagrams depicting example incremental replications that can be performed between distinct data storage sites in accordance with various aspects described herein.
Figure 3:
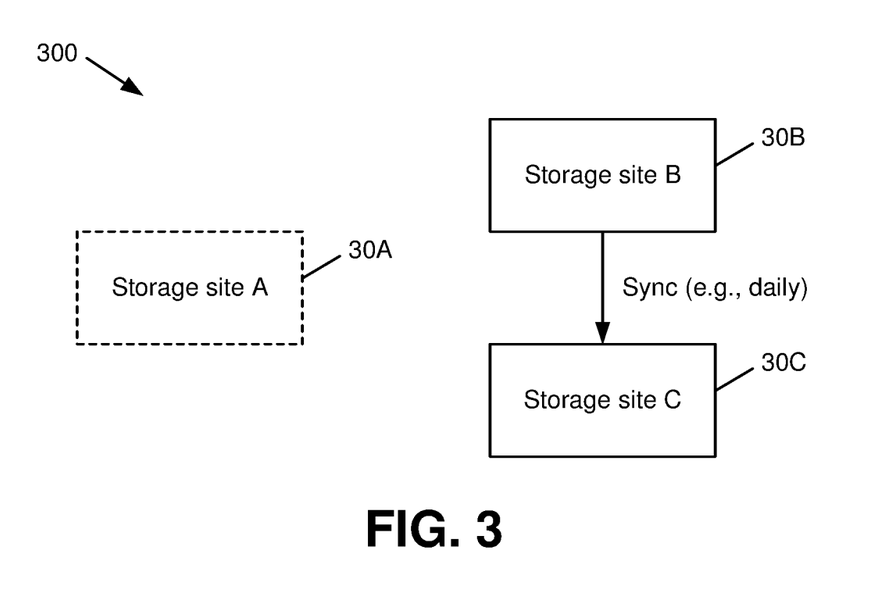

By way of example, system 100 can be used to enable a scenario as illustrated by FIGS. 2-3 for a set of example storage sites 30, shown in FIGS. 2-3 as storage sites 30A-30C. The storage sites 30A-30C can be associated with respective data storage systems of any suitable types, and storage sites 30A-30C need not be associated with a same type of system. For instance, storage site 30A can belong to a file storage system of a first architecture, storage site 30B can belong to a file storage system of a second, different architecture, and storage site 30C can belong to an object storage system, such as a cloud storage system. Other configurations could also be used.

Referring now to FIG. 2, diagram 200 shows a replication arrangement where storage site 30A replicates data associated with a given dataset to storage site 30B on a first schedule, e.g., a daily synchronization schedule. As further shown in diagram 200, storage site 30A also replicates data associated with the same dataset to storage site 30C on a second schedule, e.g., a weekly synchronization schedule.

Subsequently, as shown by diagram 300 in FIG. 3, in the event that storage site 30A fails (e.g., temporarily or permanently), the synchronization schedules associated with storage site 30A to both storage site 30B and storage site 30C become disrupted. However, by utilizing system 100 and/or other aspects as described herein, storage site 30B can establish replication for data associated with the dataset to storage site 30C, e.g., according to the daily synchronization schedule initially established between storage site 30A and storage site 30B and/or a different schedule, without first running a full baseline replication from storage site 30B to 30C. In an aspect, transfers as shown by diagram 300 can occur subsequent to a failover from storage site 30A to storage site 30B, e.g., as performed according to one or more techniques known in the art.

Figure 4:
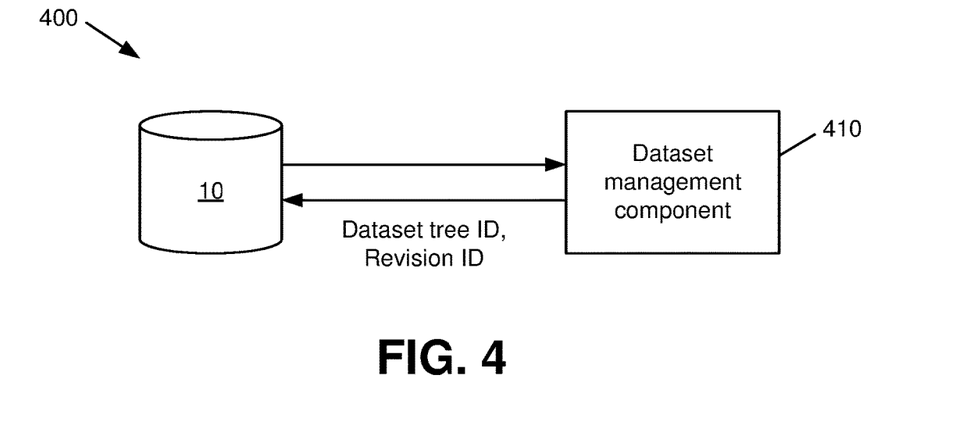
FIG. 4 is a block diagram of a system that facilitates metadata assignment for a dataset in accordance with various aspects described herein.

With reference next to FIG. 4, a block diagram of a system 400 that facilitates metadata assignment for a dataset 10 in accordance with various aspects described herein is illustrated. Repetitive description of like elements employed in other embodiments described herein is omitted for brevity. As shown by FIG. 4, system 400 includes a dataset management component 410, which can assign a dataset identifier and/or other metadata to a given dataset. In an aspect, a dataset identifier can be a globally unique set of identifying data that is assigned to a dataset 10 at the time the dataset 10 is defined.

As further shown in FIG. 4, a dataset identifier associated with a dataset 10 by the dataset management component 410 can include information such as a dataset tree identifier, which can itself be a globally unique identifier that identifies all datasets originating from the same baseline transfer. Stated another way, a dataset 10 can be assigned a dataset tree identifier at the time the dataset is initially created, and subsequent datasets that are modifications of and/or otherwise originate from said original dataset can be assigned the same dataset tree identifier.

The dataset identifier associated with a given dataset 10 as shown by FIG. 4 can further include a revision identifier, which can be used to identify individual versions or revisions of a dataset. For instance, a database tree identifier as described above can be used in combination with a revision identifier to identify and distinguish between different dataset versions that are derived from the same baseline transfer.

In an aspect, the dataset tree identifier, revision identifier, and/or other information associated with a dataset identifier as applied by the dataset management component 410 can be composed of numeric values, character strings, and/or any other suitable data of any suitable format(s). In general, the revision identifier applied by the dataset management component 410 to a given dataset can be any suitable type of globally unique identifier, e.g., in order to avoid dataset identifier conflicts associated with datasets that are generated for the same tree but on different systems.

In a further aspect, a dataset 10 can be defined with respective properties, e.g., that can be assigned to the dataset 10 by the dataset management component 410 and/or by other means. These properties can include, but are not limited to, the following:

A) Dataset identifier, e.g., as described above.

B) Dataset type, which can be defined by the data formats of the source and target systems and/or the type of transfer associated with the dataset. By way of example, a dataset designated for a copy replication from a file storage system to an object storage system can be given the type FILE_ON_OBJECT_COPY, a dataset designated for a backup replication from a file storage system to an object storage system can be given the type FILE_ON_OBJECT_BACKUP, and a dataset designated for transfer between two file storage systems can be given the type FILE_ON_FILE. Other dataset types are also possible.

C) Base path, e.g., the location on the source and/or target systems at which the dataset resides.

D) Local system database history, which can include a listing of respective versions of a dataset stored by a given system and/or other information. Examples of dataset histories that can be created and used for incremental replication are described in further detail below with respect to FIGS. 6-7.

E) Transfer debt, e.g., a list of files, directories, and/or other information associated with a dataset that were not successfully transferred during one or more previous replication attempts.

Figure 5:
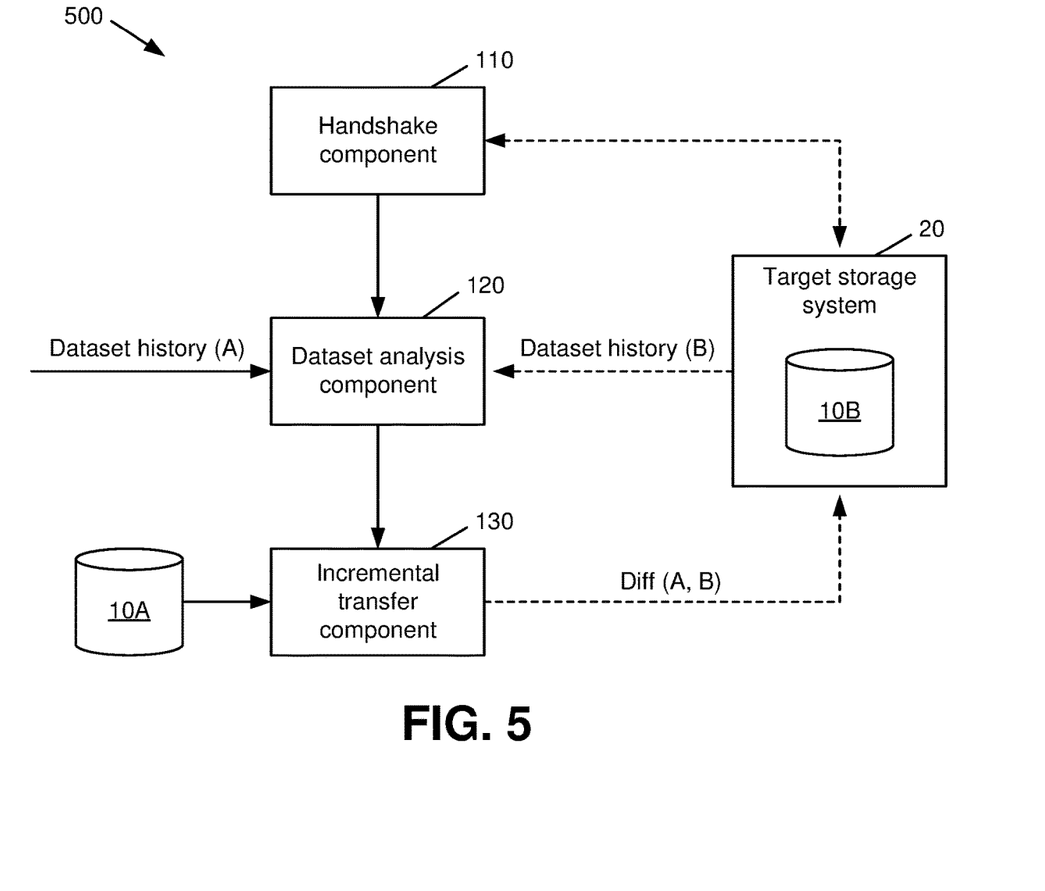
FIG. 5 is a block diagram of a system that facilitates incremental replication between foreign system dataset stores based on local and remote dataset metadata in accordance with various aspects described herein.

Referring now to FIG. 5, a block diagram of a system 500 that facilitates incremental replication between foreign system dataset stores based on local and remote dataset metadata in accordance with various aspects described herein is illustrated. Repetitive description of like elements employed in other embodiments described herein is omitted for brevity. As shown in FIG. 5, system 500 is similar to system 100 as described above with respect to FIG. 1, with the exception that the dataset analysis component 120 can determine whether a dataset 10A associated with system 500 and a dataset 10B associated with the target storage system 20 are compatible datasets by comparing (local) dataset histories associated with datasets 10A and 10B.

In an aspect, the dataset analysis component 120 can obtain a local dataset history for dataset 10A, e.g., from the dataset management component 410 and/or other suitable sources. As additionally shown in FIG. 5, the dataset analysis component 120 can further receive a local dataset history for dataset 10B as stored on the target storage system 20, which can be similarly structured to the local dataset history for dataset 10A. The local dataset history for dataset 10B can be computed at the target storage system 20, e.g., via a component similar to the dataset management component 410 of system 400, and/or derived or provided in any other suitable manner.

In response to receiving the local dataset histories for datasets 10A and 10B, the dataset analysis component 120 can determine whether datasets 10A and 10B as stored on their respective systems are compatible, e.g., by determining whether a dataset version associated with the local dataset history of dataset 10B, e.g., a current version of dataset 10B and/or another version, is also present in the local dataset history for dataset 10A. If datasets 10A and 10B are found to be compatible datasets in this manner, the dataset analysis component can further compare the local dataset histories for dataset 10A and 10B in order to determine whether an incremental replication of dataset 10A can be performed, e.g., by the incremental transfer component 130, as well as to identify the dataset elements to be included in the incremental replication. Techniques for obtaining and comparing dataset histories in this manner are described in further detail below with respect to FIGS. 6-7.

In an aspect, the dataset analysis component 120 can also obtain and compare respective dataset tree identifiers associated with respective datasets in the local histories of datasets 10A and 10B (e.g., as provided by the dataset management component 410 as described above) in order to limit the dataset history comparison as performed by the dataset analysis component 120 to only datasets having a common dataset tree identifier.

Figure 6:
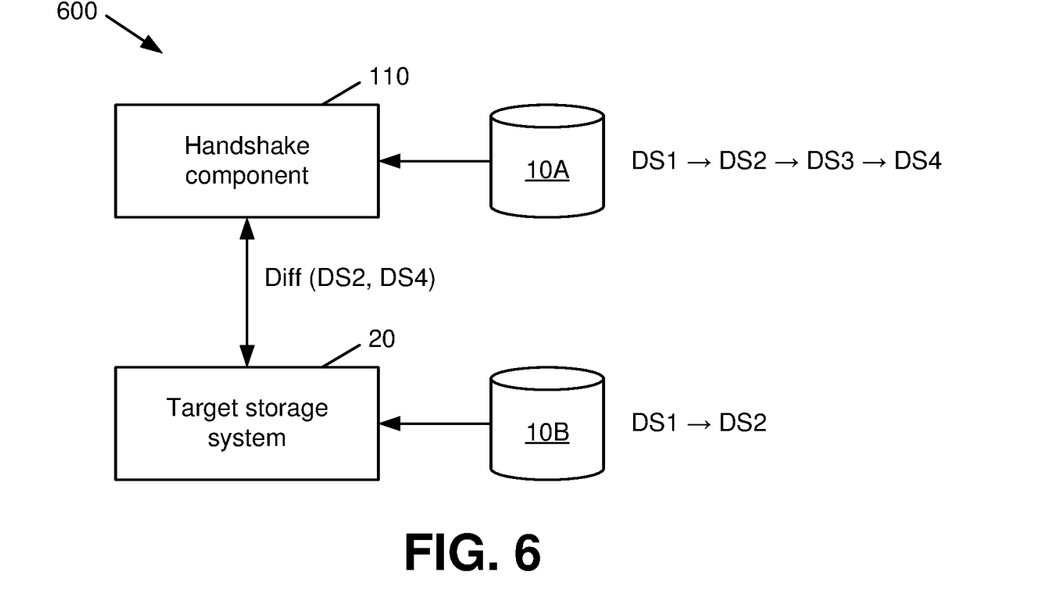
FIGS. 6-7 are respective diagrams depicting respective example handshake procedures for incremental dataset replication that can be conducted by a pair of data storage systems in accordance with various aspects described herein.

Turning next to FIG. 6, a diagram 600 of an example handshake procedure that can be performed by a handshake component 110, e.g., a handshake component 110 of system 100 or system 500, and a target storage system 20 is illustrated. Repetitive description of like elements employed in other embodiments described herein is omitted for brevity. In an aspect as shown by diagram 600, each system that can replicate and/or receive datasets according to various aspects as described herein can maintain an index, database, listing, and/or other information pertaining to the datasets the system contains. This index can include, among other information, dataset histories for respective stored datasets, e.g., on a per-dataset tree basis.

By way of example, diagram 600 illustrates that a system associated with the handshake component 110 can be associated with a first dataset 10A having a dataset history of DS1-DS2-DS3-DS4, where DS1 is the earliest dataset stored by the system that belongs to the dataset tree associated with dataset 10A and DS4 is the latest dataset in said dataset tree. Similarly, the target storage system 20 shown in diagram 600 can be associated with a second dataset 10B that has a similarly structured dataset history of DS1-DS2, where DS1 and DS2 are dataset revisions that have been stored by both the system associated with the handshake component 110 and the target storage system 20.

In an aspect, each incremental transfer between the systems shown by diagram 600 can begin with a transfer-begin handshake procedure. In addition to session setup and authentication mechanisms that can be performed according to one or more techniques as known in the art, this handshake procedure can be used to ensure that the target dataset to be synced, e.g., dataset 10B in diagram 600, exists in the dataset history of the source dataset, e.g., dataset 10A in diagram 600. In the example shown by diagram 600, the handshake component 110 can communicate with the target storage system 20 via the handshake procedure to determine whether datasets 10A and 10B are compatible, i.e., whether there are datasets in common in the respective dataset histories for datasets 10A and 10B. Because datasets 10A and 10B as shown by diagram 600 have historical datasets DS1 and DS2 in common, the handshake procedure between the handshake component 110 and the target storage system 20 can terminate successfully, resulting in an incremental transfer to the target storage system 20 of the differences between dataset 10A and dataset 10B, i.e., a differential between historical datasets DS2 and DS4.

Figure 7:
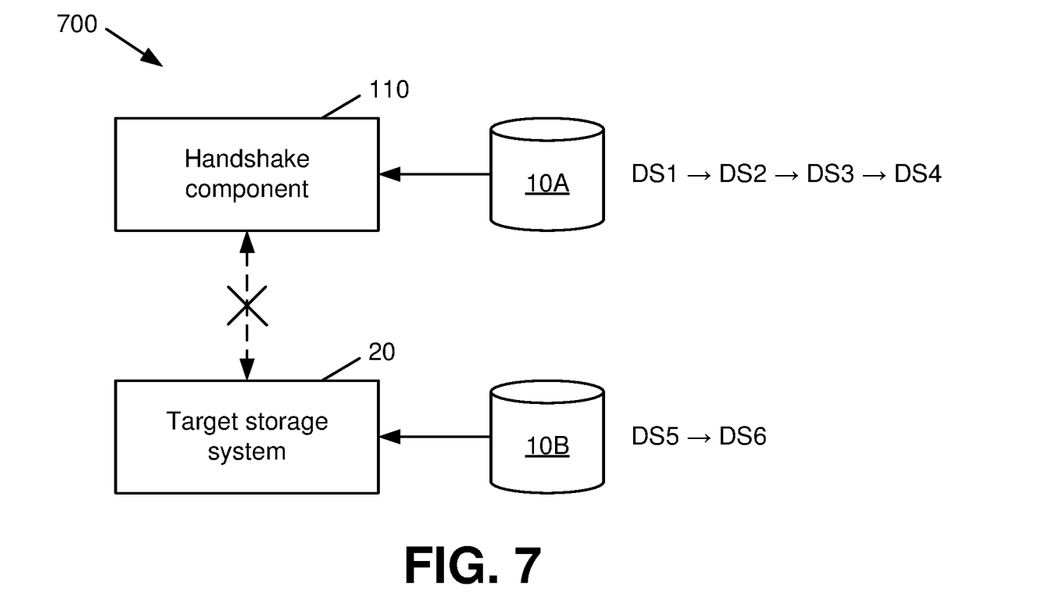

Alternatively, in another example shown by diagram 700 in FIG. 7, datasets 10A and 10B are determined during the handshake procedure to be incompatible, e.g., due to dataset 10A being associated with a first dataset tree and dataset 10B being associated with a second, different dataset tree having a dataset history of DS5-DS6, the transfer-begin handshake between the handshake component 110 and the target storage system 20 can fail, resulting in no incremental transfer subsequently taking place. Notwithstanding a failed transfer-begin handshake as shown by diagram 700, dataset 10A could still subsequently be provided to the target storage system 20, e.g., in a full baseline transfer. Also or alternatively, the handshake component 110 could generate an alert or other notice in response to a failed transfer-begin handshake to facilitate the manual performance of further action, e.g., by a system administrator or other user.

Figure 8:
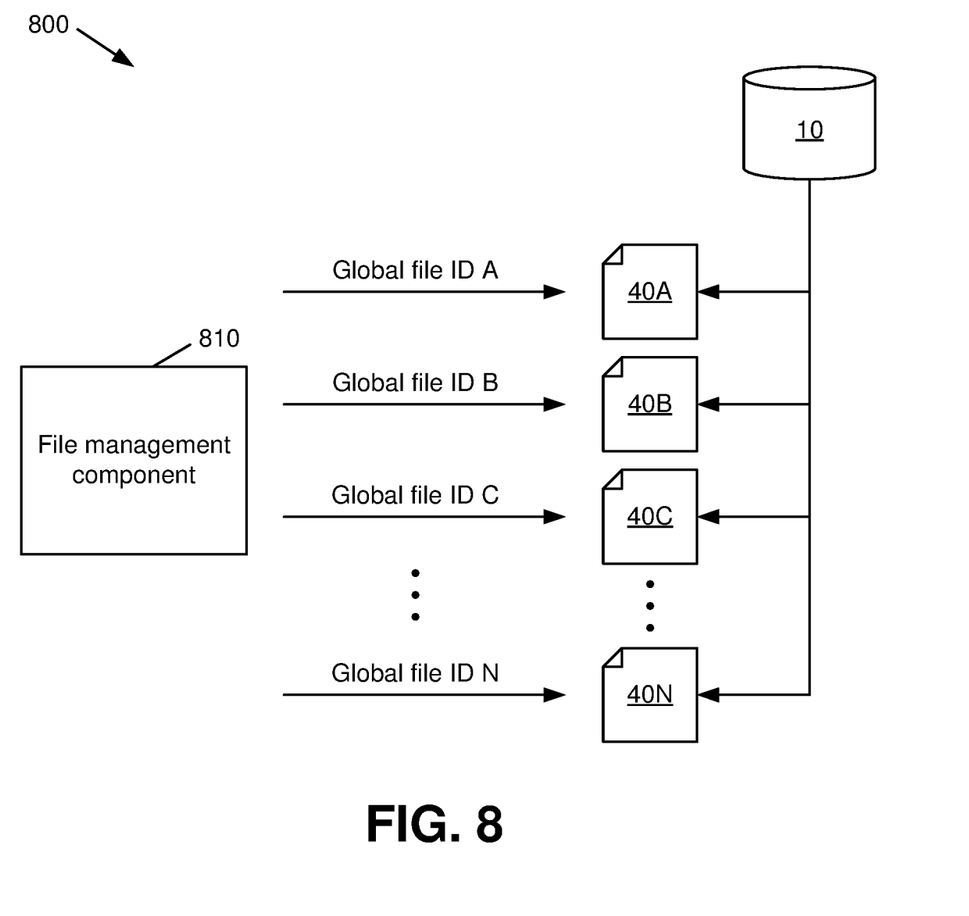
FIG. 8 is a block diagram of a system that facilitates assigning global file metadata to respective files in a dataset in accordance with various aspects described herein.

Referring next to FIG. 8, a block diagram of a system 80 that facilitates assigning global file metadata to respective files 40 in a dataset 10 in accordance with various aspects described herein is illustrated. Repetitive description of like elements employed in other embodiments described herein is omitted for brevity. As shown by FIG. 8, a dataset 10 can be associated with respective files 40, shown in FIG. 8 as files 40A-40N. While FIG. 8 illustrates a dataset 10 containing an arbitrary number N of files 40, it should be appreciated that a dataset 10 could contain any suitable number of files 40, including one file or multiple files. System 800 as shown by FIG. 8 further includes a file management component 810, which can assign respective global file identifiers to respective files 40 of a group of files belonging to the dataset 10.

In an aspect, the file management component 810 can assign globally unique identifiers, referred to herein as global file identifiers, to respective files 40 upon creation of a dataset 10 corresponding to the files 40, e.g., in response to the respective files 40 of the dataset 10 being replicated for the first time. These global file identifiers as assigned by the file management component 810 can be replicated along with the corresponding file data and can represent perpetual global file identifiers when replicated outside of a given system.

In a further aspect, the global file identifier for a given file 40 can be generated as a data structure that can include fields such as a character string containing the text of the global file identifier as well as other information, such as a substructure that contains a local file identifier for the file 40 that is specific to the system on which the file 40 resides. As further shown by system 900 in FIG. 9, local file identifiers for given files 40 can be generated by a mapping component 910 by mapping the global file identifiers associated with the respective files 40 to respective local file identifiers that are specific to the system on which the files 40 reside.

Figure 9:
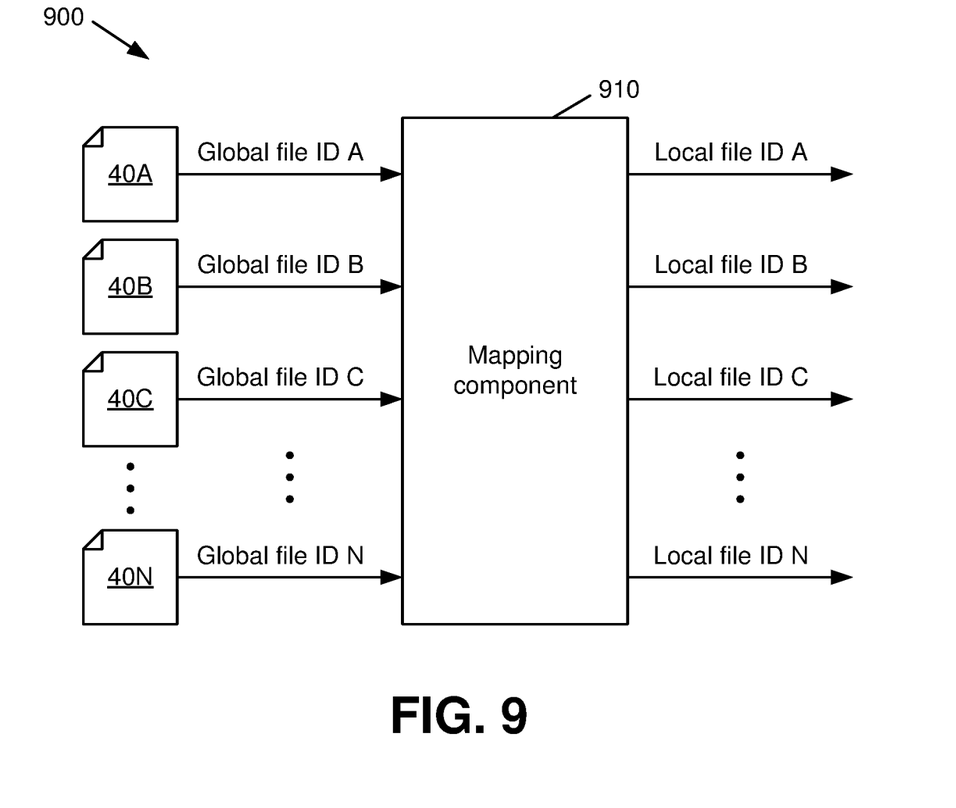
FIG. 9 is a block diagram of a system that facilitates mapping global file metadata associated with respective files in a dataset to local file metadata in accordance with various aspects described herein.

Each system to which respective files 40 and/or datasets 10 can be replicated can utilize the mapping component 910 as shown in system 900 to maintain a bi-directional mapping between local file identifiers and global file identifiers associated with respective files. Accordingly, a system can utilize the mapping component 910 to map a global file identifier associated with a given file 40 to a local file identifier for the file 40 that is specific to the system without replicating local file identifiers outside of a given system.

In an aspect, the local file identifier for a given file 40 can be arranged as a data structure that can include an identifying character string and/or other identifying information, e.g., in a similar manner to the global file identifier structure as described above. In addition, a data structure for a local file identifier can further include fields that specify various properties of the underlying file, such as the drive or device on which the file is stored, an inode and/or generation number associated with the file, a version of the file, and/or other properties.

During a baseline replication, global file identifiers can be generated on a source system and propagated to mapping databases on respective target systems. A local-to-global mapping can subsequently be used for incremental synchronization, e.g., such that a file 40 modified on a source system can be represented via the global file identifier and sent to a target system. Similarly, a global-to-local mapping can be used for incremental synchronization on target systems, e.g., to find a local destination file on which to record the differential. In an aspect, a file storage system can maintain both of the above mappings, while in the case of a file-to-object or object-to-file replication these mappings can be omitted if objects are named after their corresponding global file identifiers.

In an aspect, a global-to-local mapping can be a one-to-many relationship, e.g., to support use cases of multiple copies of a dataset on a single system. In a case in which there is only one copy of a specific dataset on a system, the mapping entries can be structured as shown below:

1) gfileid1→fileid1,
2) gfileid2→fileid2,
where gfileid represents a global file identifier and fileid represents a local file identifier.

Alternatively, in cases in which there are multiple copies of the same dataset on a system, the mapping entries can be structured as follows:

1) gfileid1→{base_path1, fileid1}, {base_path2, fileid2};
2) gfileid2→{base_path1, fileid3}, {base_path2, fileid4};
where base_path represents the directory path associated with a given file on the system. In an aspect, these mappings can be stored in a key-value store (KVS) and/or via other suitable structures.

Briefly returning to FIG. 1 and with further reference to FIGS. 8-9, the incremental transfer component 130 can utilize global and/or local file identifiers associated with respective files 40 of a dataset 10 in building a differential between dataset 10A as stored on system 100 and dataset 10B as stored on the target storage system 20. For instance, the incremental transfer component can create the differential by determining global file identifiers for respective files that were changed (e.g., added, removed, modified, etc.) between the dataset version represented by dataset 10B and the dataset version represented by dataset 10A. These identified files can then be added to the differential according to their respective global file identifiers.

Figure 10:
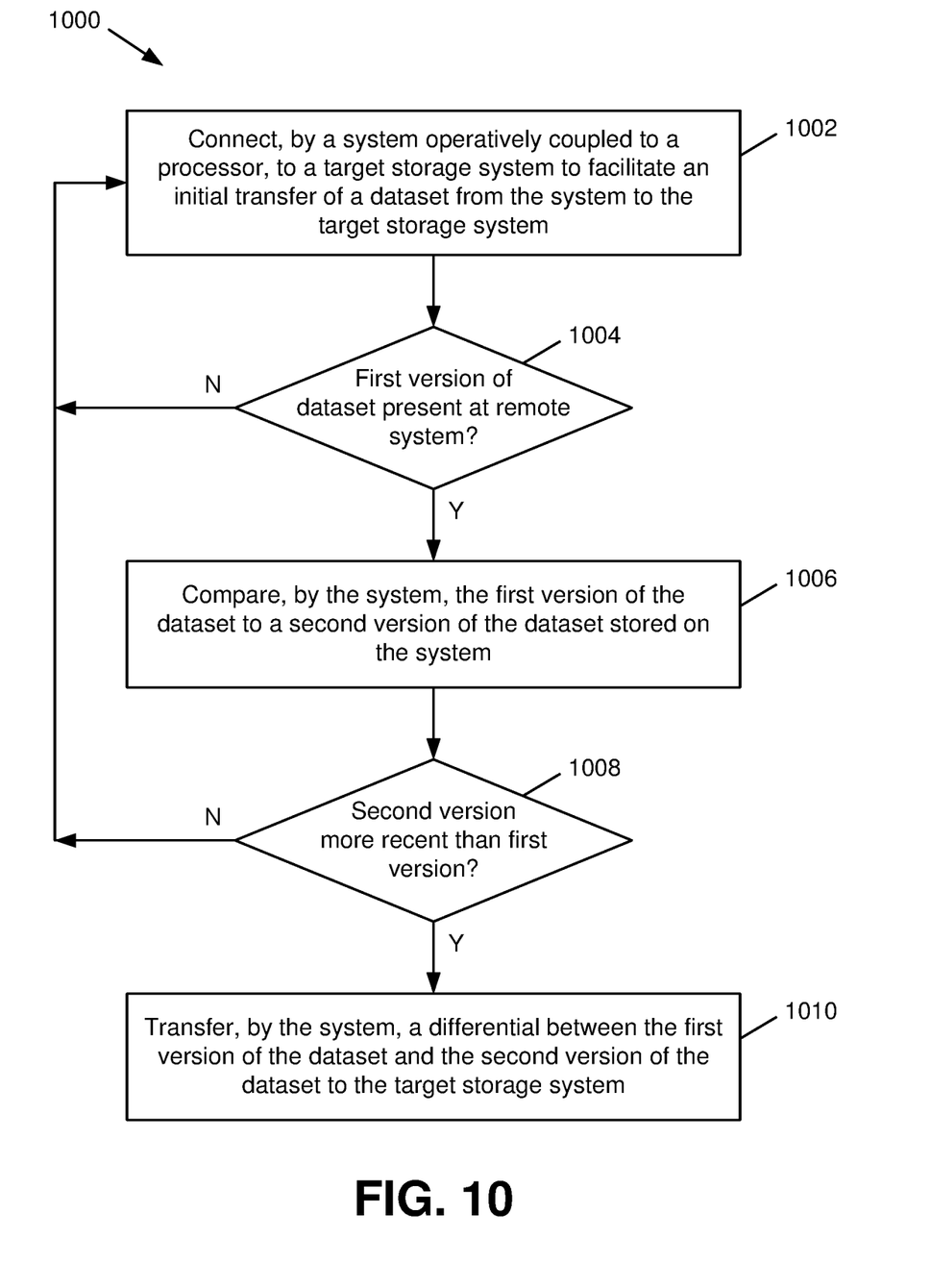
FIG. 10 is a flow diagram of a method that facilitates incremental replication between foreign system dataset stores in accordance with various aspects described herein.

Referring next to FIG. 10, a flow diagram of a method 1000 that facilitates incremental replication between foreign system dataset stores in accordance with various aspects described herein is illustrated. At 1002, a system operatively coupled to a processor can connect (e.g., by a handshake component 110) to a remote storage system (e.g., a target storage system 20) to facilitate an initial transfer of a dataset (e.g., a dataset 10) from the system to the remote storage system. As used here, the term "initial transfer" refers to a first transfer of the dataset between the system and the remote storage system, e.g., such that no previous transfers of the dataset have occurred between said systems.

At 1004, the device can determine (e.g., by the dataset analysis component 120) whether a first version of the dataset (e.g., dataset 10B) is present at the remote storage system. If a first version of the dataset is not present at the remote storage system, method 1000 can return to 1002 for processing of additional datasets. In contrast, if a first version of the dataset is present at the remote storage system, method 1000 can instead continue to 1006.

At 1006, the device can compare (e.g., by the dataset analysis component 120) the first version of the dataset at the remote storage system to a second version of the dataset (e.g., dataset 10A) as stored on the system performing method 1000.

At 1008, the device can further determine (e.g., by the dataset analysis component 120) whether the second version of the dataset as stored by the system is more recent than the first version of the dataset as stored by the remote storage system. If the dataset as stored on the system is not more recent than the version stored on the remote storage system, method 1000 can return to 1002 for processing of additional datasets. In contrast, if the dataset as stored on the system is more recent than the version stored on the remote storage system, method 1000 can instead conclude at 1010.

At 1010, the device can transfer (e.g., by an incremental transfer component 130) a differential between the first version of the dataset and the second version of the dataset to the remote storage system.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
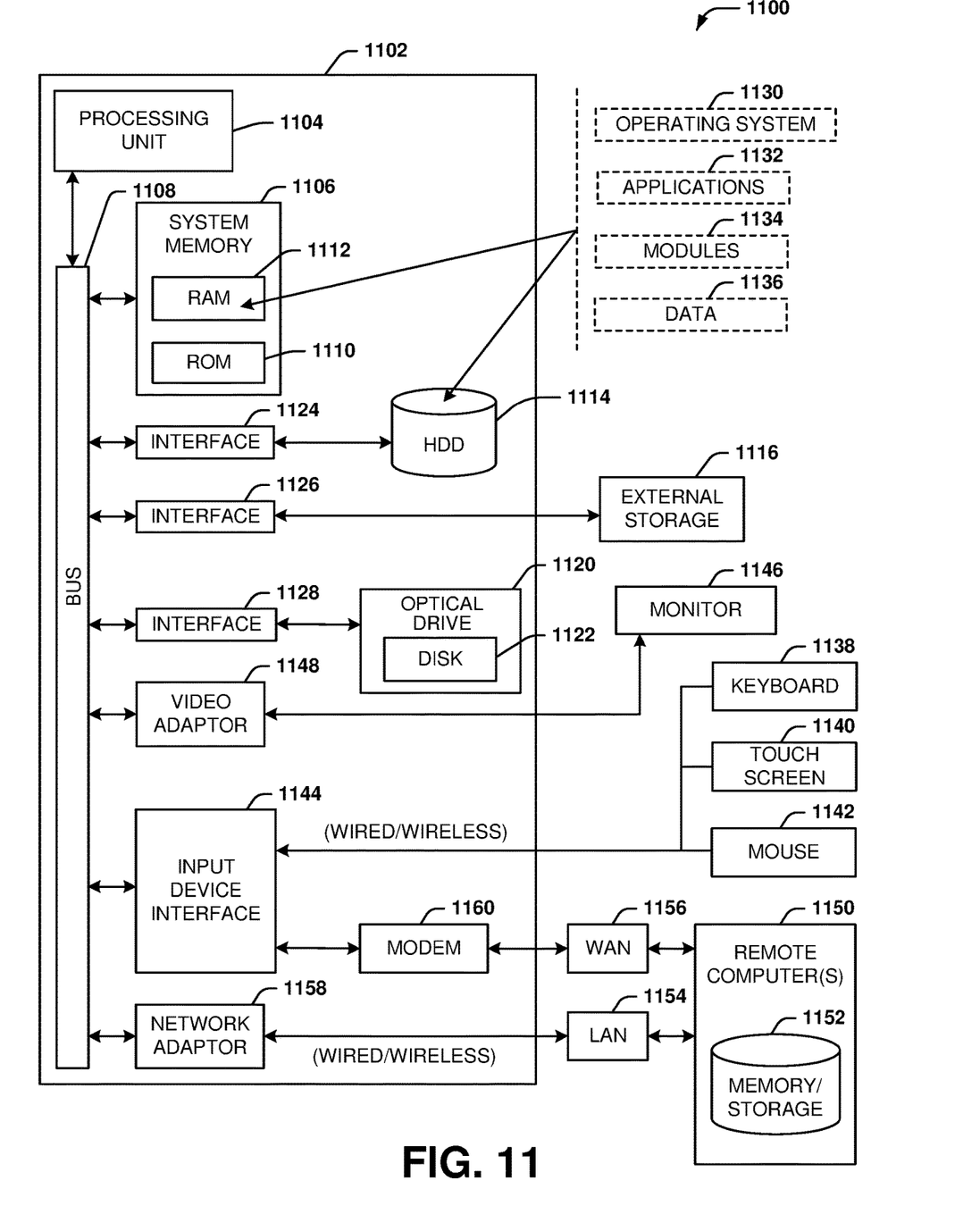
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A file storage system, comprising:
a memory that stores executable components; and
a processor that executes the executable components stored in the memory, wherein the executable components comprise:
a handshake component that establishes a connection with a cloud storage system, in which data is stored in an object format that is distinct from a file format used by the file storage system, to facilitate an initial transfer of a dataset from the file storage system to the cloud storage system;
a dataset analysis component that, in response to the cloud storage system indicating via the connection that a first version of the dataset is stored in the object format at the cloud storage system, compares the first version of the dataset to a second version of the dataset as stored in the file format on the file storage system; and
an incremental transfer component that, in response to the dataset analysis component determining that the second version of the dataset is more recent than the first version of the dataset, creates, in the object format, a differential between the first version of the dataset and the second version of the dataset and transfers the differential to the cloud storage system, wherein the differential comprises less than all of the second version of the dataset.

2. The file storage system of claim 1, wherein the executable components further comprise:
a dataset management component that assigns a dataset identifier to the second version of the dataset, wherein the dataset identifier comprises a dataset tree identifier and a revision identifier.

3. The file storage system of claim 2, wherein the dataset identifier is a second dataset identifier comprising a second dataset tree identifier and a second revision identifier, and wherein the dataset analysis component receives a first dataset identifier associated with the first version of the dataset from the cloud storage system, the first dataset identifier comprising a first dataset tree identifier and a first revision identifier.

4. The file storage system of claim 1, wherein the dataset analysis component compares the first version of the dataset as stored on the cloud storage system to the second version of the dataset further in response to determining that the first version of the dataset is present in a dataset history corresponding to the dataset as maintained by the file storage system.

5. The file storage system of claim 4, wherein the dataset history is a first dataset history, and wherein the dataset analysis component compares the first version of the dataset to the second version of the dataset by comparing the first dataset history to a second dataset history corresponding to the dataset as maintained by the cloud storage system.

6. The file storage system of claim 1, wherein the second version of the dataset comprises a group of files, and wherein the executable components further comprise:
a file management component that assigns respective global file identifiers to respective files of the group of files.

7. The file storage system of claim 6, wherein the executable components further comprise:
a mapping component that maps the respective global file identifiers to respective local file identifiers associated with the file storage system.

8. The file storage system of claim 6, wherein the incremental transfer component creates the differential by determining global file identifiers for respective modified files of the group of files that have been altered between the first version of the dataset and the second version of the dataset and adding the respective modified files of the group of files to the incremental according to their respective global file identifiers.

9. A method, comprising:
connecting, by a file storage system operatively coupled to a processor, to a cloud storage system, in which data is stored in an object format that is distinct from a file format used by the file storage system, to facilitate an initial transfer of a dataset from the file storage system to the cloud storage system;

in response to determining that a first version of the dataset is stored in the object format on the cloud storage system, comparing, by the file storage system, the first version of the dataset to a second version of the dataset stored in the file format on the file storage system; and in response to determining that the second version of the dataset is more recent than the first version of the dataset, generating, by the file storage system in the object format, a differential between the first version of the dataset and the second version of the dataset, the differential comprising less than all of the second version of the dataset, and transferring, by the file storage system, the differential to the cloud storage system.

10. The method of claim 9, further comprising:

receiving, by the system, a first dataset identifier associated with the first version of the dataset from the cloud storage system, the first dataset identifier comprising a first dataset tree indicator and a first revision indicator; and assigning, by the file storage system, a second dataset identifier to the second version of the dataset, the second dataset identifier comprising a second dataset tree indicator and a second revision indicator.

11. The method of claim 9, wherein the comparing comprises comparing the first version of the dataset to the second version of the dataset further in response to determining that the first version of the dataset is present in a dataset history corresponding to the dataset as maintained by the file storage system.

12. The method of claim 11, wherein the dataset history is a first dataset history, and wherein the comparing further comprises comparing the first dataset history to a second dataset history corresponding to the dataset as maintained by the cloud storage system.

13. The method of claim 9, wherein the second version of the dataset comprises respective files, and wherein the method further comprise:

assigning, by the file storage system, respectively assigning respective global file identifiers to the respective files.

14. The method of claim 13, further comprising:

mapping, by the file storage system, the respective global file identifiers to respectively corresponding local file identifiers associated with the file storage system.

15. A non-transitory machine-readable medium comprising computer executable instructions that, when executed by a processor of a file storage system, facilitate performance of operations, the operations comprising:

initiating an initial transfer of a dataset from the file storage system to a cloud storage system that is distinct from the file storage system and stores data in an object format that is distinct from a file format used by the file storage system;

in response to the cloud storage system indicating that a first revision of the dataset is present in the object format on the cloud storage system, comparing the first revision of the dataset to a second revision of the dataset as stored in the file format on the file storage system; and in response to the first revision of the dataset being earlier than the second revision of the dataset, generating, in the object format, a differential between the first revision of the dataset and the second revision of the dataset, wherein the differential comprises less than all of the dataset, and transferring the differential to the cloud storage system.

16. The non-transitory machine-readable medium of claim 15, wherein the operations further comprise:

receiving a first dataset tree identifier and a first revision identifier associated with the first revision of the dataset from the cloud storage system; and associating a second dataset tree identifier and a second revision identifier to the second revision of the dataset as stored on the file storage system.

17. The non-transitory machine-readable medium of claim 15, wherein the operations further comprise:

comparing the first revision of the dataset to the second revision of the dataset, further in response to the first revision of the dataset being present in a first dataset history corresponding to the dataset as maintained by the file storage system by comparing the first dataset history to a second dataset history corresponding to the dataset as maintained by the cloud storage system.

18. The non-transitory machine-readable medium of claim 15, wherein the second version of the dataset comprises respective files, and wherein the operations further comprise:

assigning respective global file identifiers to the respective files of the dataset.

19. The file storage system of claim 1, wherein the incremental transfer component creates the differential in the object format by generating the differential in the file format and converting the differential from the file format to the object format.

20. The file storage system of claim 6, wherein the differential comprises a data object in the object format, and wherein the incremental transfer component assigns a name to the data object based on a global file identifier, of the respective global file identifiers, corresponding to the data object.

* * * * *